(12) United States Patent
Aizikowitz et al.

(10) Patent No.: US 6,526,571 B1
(45) Date of Patent: Feb. 25, 2003

(54) METHOD FOR IDENTIFYING CALLS IN JAVA PACKAGES WHOSE TARGETS ARE GUARANTEED TO BELONG TO THE SAME PACKAGE

(75) Inventors: Nava Aizikowitz, Haifa (IL); Vitaly Feldman, Haifa (IL); Ayal Zaks, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,661

(22) Filed: Mar. 16, 1999

(51) Int. Cl.$^7$ ................................................ G06F 9/45
(52) U.S. Cl. ...................................... 717/154; 713/167
(58) Field of Search ................................ 717/8, 9, 4, 5, 717/124–167; 709/100, 310–332; 713/164–167

(56) References Cited

U.S. PATENT DOCUMENTS

| | | | |
|---|---|---|---|
| 5,603,031 A | * 2/1997 | White et al. | 709/317 |
| 5,966,539 A | * 10/1999 | Srivastava | 717/156 |
| 6,038,395 A | * 3/2000 | Chow et al. | 717/105 |
| 6,230,314 B1 | * 5/2001 | Sweeney et al. | 717/108 |

OTHER PUBLICATIONS

Wirfs–Brock, Large Java applications breaking the speed limit, http://www.instantiations.com/java1talk/sld001.htm, Jun. 1998.*

Bacon & Sweeney "Fast Static Analysis of C++ Virtual Function Calls".

David Griswold, "The Java Hotspot, Virtual Machine Architech", (Mar. 1998).

Instantiations, Inc. "Jove Super Optimizing Deployment Environment for Java".

Java in a Nutshell, A Desktop Quick Reference, $2^{nd}$ Edition, David Flanagan, Covers Java 1.1.

The Java Language Specification, James Gosling, Bill Joy, Guy Steele, Chapter 7, "Packages", p. 113.

* cited by examiner

*Primary Examiner*—Gregory Morse
*Assistant Examiner*—Hoang-Vu Antony Nguyen-Ba
(74) *Attorney, Agent, or Firm*—Browdy and Neimark, P.L.L.C.

(57) ABSTRACT

A method and system for identifying calls in a Java package whose targets are guaranteed to belong to the package. According to the method an inheritance graph and access permissions of respective components in the package are determined, both of which are used in combination with the knowledge that the package is seared and signed to determine whether all the targets of a call are guaranteed to belong to the package. The identification of calls according to the invention can be performed at the time the package is sealed and signed or as a separate phase thereafter and allows for better compiler optimization.

30 Claims, 8 Drawing Sheets

//Input: (1) Class Hierarchy Graph where nodes represent the classes and interfaces of a
//package, and arcs represent inheritance relationships. (2) Every node $n$ has a set $D(n)$ of
//declared methods. (3) A class $c$ and method $m$.

//Output: An indication if calls to the given method $c::m$ are sealed.

Function: boolean aClassOrSubclassCanSmuggle(class $c$, method $m$, boolean *mIsExposed*)

//A method that scans the inheritance tree rooted at class $c$, looking for a public non-final
//subclass that declares $m$ as public/protected non-final, or inherits such a declaration
//from a superclass.

//Returns true if such a subclass exists, otherwise false. If $c$ inherits a declaration for $m$
//from a superclass, then *mIsExposed* is true if and only if this superclass declares $m$ as
//public or protected. Sets PublicNonFinalSubclassFound to true if $c$ is public non-final
//and the method returns false.

// 1. *check if $c$ or $c::m$ are* final if ($isFinalClass(c) \lor (m \in D(c) \land isFinalMethod(c, m)$))

return (false);

// 2. *check if $c$ can "smuggle" an overriding of $m$* if ($m \in D(c)$)     // *the access to $c::m$ is the same as inherited (mIsExposed) or more general*

*mIsExposed* = *(isPublicMethod(c, m)* $\lor$ *isProtectedMethod(c, m))*;

if (*isPublicClass(c)* $\land$ *mIsExposed*)

return (true);

// 3. *check recursively if a subclass of $c$ can "smuggle" an overriding of $m$* foreach *class sub directly extending $c$* do if *aClassOrSubclassCanSmuggle(sub, m, mIsExposed)* return (true);

if *isPublicClass(c)*     // final *checked above*

PublicNonFinalSubclassFound = true;

return (false);

FIG. 5a: Algorithm — Auxiliary Functions

Function: boolean mMayBeLiveAtC(method m, class c)

// Returns true if c, or a subclass of c (from within the package or potentially from // another package) that uses c's declaration of m can be instantiated. Otherwise // returns false.

if not isAbstractClass(c)   // c can be instantiated return (true);

*if* isPublicClass(c)   // now c is abstract, hence not final return (true);   // c can be subclassed outside its package foreach class sub directly extending c do if ((m $\notin$ D(sub)) $\wedge$ (mMayBeLiveAtC(m, sub)))

return (true);

return (false);

<center>FIG. 5b: Algorithm — Auxiliary Functions</center>

Main Function: boolean isSealedClassMethod(class c, method m)

// Returns Sealed if a call to method m of class c is sealed. Otherwise returns NotSealed.

global boolean PublicNonFinalSubclassFound = false;

boolean mIsExposed;   //indicates if c inherits a public/protected declaration of m

// 1. Check if c inherits a declaration of m from a superclass if (m $\notin$ D(c)) do

// 1.a Search superclasses inside the package for declaration of m class super = superClass(c);

while ((super $\neq$ null) $\wedge$ (m $\notin$ D(super))) do super = superClass(super);

end

<center>FIG. 6a: Algorithm — Identifying a Sealed Call to a Class Method</center>

// 1.b If none found — check potential for external overriding if (*super* = null) do   // *super* not in package; *m* declared public by superinterface,

*mIsExposed* = true;   // or by a superclass from another package if *mMayBeLiveAtC*(*c*,*m*)

return (NotSealed);// an external superclass implements *m* — a potential target end

// 1.c If found — check modifiers else do   // *super* in package and declares *m*

*mIsExposed* = (*isPublicMethod*(*super*, *m*) ∨ *isProtectedMethod*(*super*, *m*));

if *isFinalMethod*(*super*, *m*)

return (Sealed);   // only one possible target, and it's inside the package end else   // *m* ∈ *D(c)*

*mIsExposed* = (*isPublicMethod*(*c*, *m*) ∨ *isProtectedMethod*(*c*, *m*));

end

// 2. check recursively if *c* or a subclass of *c* can "smuggle" an overriding of *m* if (*aClassOrSubclassCanSmuggle*(*c*, *m*, *mIsExposed*))

return (NotSealed);

if PublicNonFinalSubclassFound foreach class *root* in package whose superclass is not in package (and is not a superclass of *c*) do if aClassOrSubclassCanSmuggle(*root*, *m*, false)

return (NotSealed);

return (Sealed);

FIG. 6b: Algorithm — Identifying a Sealed Call to a Class Method

Main Function: boolean isSealedInterfaceMethod(interface *i*, method *m*)

// Returns Sealed if a call to method m of interface i is sealed. Otherwise
//returns NotSealed.

// 1. check if *i* can "smuggle" an overriding of m if isPublicInterface(*i*)      // isPublicMethod(m) holds implicitly for interfaces return (NotSealed);

// 2. check recursively if a subinterface/subclass of *i* can "smuggle" an overriding of m foreach class *c* implementing *i* do if (isSealedClassMethod(*c*, *m*) = NotSealed)

return (NotSealed);

foreach interface *subi* extending *i* do if (isSealedInterfaceMethod(*subi*, *m*) = NotSealed)

return (NotSealed);

return (Sealed);

FIG. 7: Algorithm — Identifying a Sealed Call to an Interface Method

METHOD FOR IDENTIFYING CALLS IN JAVA PACKAGES WHOSE TARGETS ARE GUARANTEED TO BELONG TO THE SAME PACKAGE

FIELD OF THE INVENTION

This invention relates to program analysis and optimization of Java program modules.

BACKGROUND OF THE INVENTION

The running time of programs can be reduced considerably by using code and compiler optimizations, which better exploit hardware resources. For programs that contain many short procedures, as many object-oriented programs do, inter-procedural optimizations are required in order to obtain efficient code. The most relevant inter-procedural optimization is inlining, which can improve performance by reducing the overhead of calls and by increasing optimization opportunities. However, inter-procedural optimizations are limited by the virtual calls of object-oriented programs. The ability to identify the potential targets of a virtual call, frequently referred to as "call devirtualization", is therefore crucial for such programs, and has received much attention in recent years.

The Java programming language and runtime environment challenges for devirtualization. In fact may even be impossible to identify in advance all possible targets of a virtual call in Java. New classes containing additional unanticipated targets might be loaded at any time. Sophisticated type analysis may be required in order to determine the possible targets of a virtual call completely. Being unsure what the potential targets are greatly limits the ability to perform inter-procedural optimizations. Such optimizations will need either to rely on the user to specify all classes and interfaces that may be dynamically loaded, or to repeatedly check what the actual target is and prepare default actions for unexpected targets. Otherwise, there is a risk that the optimization will become obsolete, in-which case a special mechanism is needed for undoing the optimization. Such a mechanism is described in "The Java™ HotSpot™ Virtual Machine Architecture" by David Griswold, published by Sun Microsystems, Inc., March 1998 and available as a White Paper at http://java.sun.com:81/products/hotspot/whitepaper.html.

In traditional object-oriented languages such as C++, the set of possible targets of a virtual call can be determined easily, or at least approximated conservatively. This is because all the classes that can possibly be used by the program are fixed and known at the time of compilation. A call to a given method may potentially target any overriding implementation of that method. So a simple approximation of a call's targets is the set of all overriding implementations of the called method. This set can be constructed efficiently by scanning the inheritance tree rooted at the called class. Various techniques have been developed in recent years to refine the set of possible targets of a virtual call, producing subsets of the set of all overriding implementations. It is known to use liveness analysis so as to exempt "dead method implementations" guaranteed never to be invoked during execution of the program from being potential target candidates. All such techniques rely on having all relevant classes that might be referenced at runtime, fixed and available at analysis time.

For Java programs, however, it is generally impossible to know in advance which classes will actually participate. The specific class-file is located and loaded only during runtime, when the class is referenced for the first time. Until this time, any change made to the class-files themselves or to other parameters (such as the CLASSPATH environment variable) may affect the classes that will be loaded. This dynamic behavior limits the ability to perform inter-class analysis, and in particular to determine the possible targets of virtual calls. There is another difference between Java and other object-oriented languages, with regards to the potential targets of virtual calls. In Java (unlike other languages) it is possible for a virtual call to reach an overriding implementation whose class does not implement the called interface. However, it is still possible to find all overriding implementations of a Java method by scanning the subclasses of the class or interface containing the method, occasionally examining the superclasses of such subclasses.

Two main approaches are currently used to cope with this dynamic nature of Java and yet enable inter-class analysis and optimization. One approach is to assume that all relevant classes are supplied by the user, and revert to traditional static techniques. Such an approach was adopted by Instantiations, Inc. in their program JOVE™, (http://www.instantiations.com/jove/jovereport.htm.) which analyzes and compiles entire "sealed" Java applications.

The major drawback of this approach is that it does not apply to (dynamic) applications that may dynamically load unanticipated classes or interfaces at runtime.

The second approach is to assume that new classes may appear (at runtime), and prepare a mechanism for detecting obsolete analyses and "undoing" optimizations that were based on such analyses. It is to be noted that it is usually impossible to "undo" an optimization after the optimized code has been entered, so a default action must be provided to deal with unanticipated targets when inlining code into certain methods. Such an approach is used by Hotspot referred to above. The major drawback of this approach is the runtime overhead inflicted by this additional mechanism, and by the occasional need to detect and deal with unanticipated targets.

It would be preferable to avoid such post-compilation by ensuring that the initial optimization is self-contained and will thus not be rendered obsolete during run-time. However, this can be achieved only if specific calls can be properly identified as "sealed calls", whose set of potential targets can be determined completely and explicitly, even prior to runtime.

SUMMARY OF THE INVENTION

It is therefore an object of the invention to provide a method for identifying in Java packages calls whose targets are guaranteed to belong to the same package.

According to the invention there is provided a method for identifying calls in a Java sealed package whose targets are guaranteed to belong to said package, comprising the steps of:

(a) verifying that the package is sealed and signed,
(b) obtaining a class hierarchy graph for classes and interfaces of said package,
(c) obtaining access permissions of respective components in said package, and
(d) using the class hierarchy graph and access permissions in combination with a knowledge that the package is sealed and signed to determine whether all the targets of the calls are guaranteed to belong to said package.

The invention exploits the feature of Version 1.2 of the Java Development Kit (JDK 1.2) which allows packages to be sealed. This capability, which primarily serves to afford higher security, is used by the invention to identify a call as a so-called "sealed call" if it appears inside a sealed and signed Java package and it is determined that all the targets are guaranteed to belong to that package.

Identifying sealed calls and their potential targets facilitates aggressive inter-procedural (intra-package) optimizations. In particular, if a sealed call has only one potential target, it can be safely inlined. Such optimizations can take place inside a Just-In-Time (JIT) compiler, inside a standard compile-time (pre-runtime) compiler, or as a byte code transformation stage.

According to the invention, certain scenarios are identified where static analysis can be applied safely, without relying on assumptions or restrictions of the entire program, and without fear of becoming obsolete or inflicting runtime overhead. It is possible to exploit the method according to the invention in those cases where it is applicable, and to use any of the former approaches elsewhere.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 5a, 5b, 6a, 6b and 7 show details of code for implementing various software algorithms associated with the invention.

DETAILED DESCRIPTION OF A PREFERRED EMBODIMENT

Figure 1A:
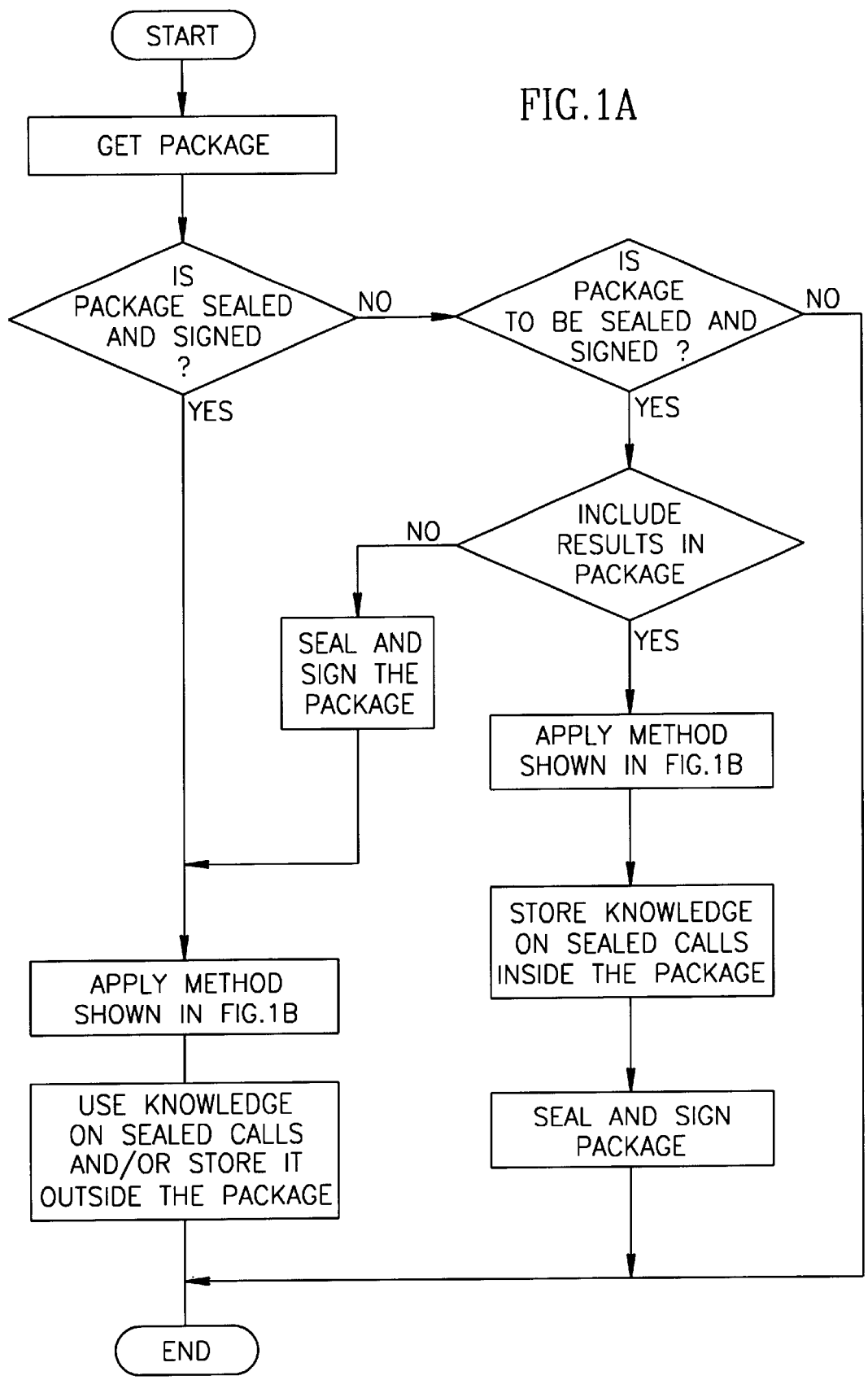
FIGS. 1a and 1b are flow diagrams showing the principal operating steps in a method according to the invention.

By way of introduction it is noted that in Version 1.2 of the Java Development Kit (JDK 1.2), a new capability was introduced, enabling Java packages that reside inside JAR files to be "sealed". If a package is sealed, all classes and interfaces defined in the package must originate from the same JAR file, otherwise an exception is thrown ("java.lang.SecurityException"). A Java package that is sealed, will be referred to throughout the specification and claims as a "sealed package". It is also possible to seal a JAR file, which means that every package inside the J file is sealed unless it is specifically declared as not sealed. When a package is sealed inside a JAR file, any application will load all relevant classes and interfaces from this JAR file (or none of them). The original motivation to seal packages was to help maintain security. However, as will be seen, the invention exploits this capability of Java in order to restrict the freedom of class loading.

Grouping together sets of class-files is important for inter-class analysis. In order to ensure the persistence of such analysis, it must be possible to detect changes, such as modification and removal of existing classes and introduction of additional classes, in both the package itself and the seal. This is provided for in the form of JAR-file signing (also available in JDK 1.2). Given the classes of a Java program, it is possible to verify whether all the currently possible targets of a call reside inside one sealed package. If not, then it is possible that some targets will change by runtime. But even if all current targets belong to one sealed package, it may still be possible for additional targets to appear before or at runtime, from other packages. It must thus be ensured that a call cannot possibly target methods from a different package; i.e. that the call is a sealed call, such that no changes in current targets and no additional targets will appear at runtime. The access restrictions imposed by the default (package) modifier of classes, interfaces and methods can be used to assure that the set of targets will not be augmented by classes external to the package.

A class, interface or method that has the default (packaged) modifier is accessible only to classes, interfaces and methods within the same package. A class, interface or method that has the default (packaged) modifier, will be referred to as a "Packaged" class, interface or method, respectively. A packaged method cannot be directly overridden by a method from a different package; only public or protected methods are accessible and can be directly overridden from outside the package. However, a packaged method may be (directly or indirectly) overridden by a public or protected method within the same package, and then be (indirectly) overridden by a method from any other package. Therefore, it must be verified that a packaged method is not overridden by a public or protected method from within its package, to conclude that no external targets can exist.

In addition, a method that belongs to a packaged (i.e. non-public) class or interface, cannot be directly overridden by a method from a different package; only public classes and interfaces are accessible (and their methods may be overridden) from outside the package. Here again it is possible to "smuggle" a method of a packaged class using a public class that extends the packaged class from within the package. Such a public (sub)class can be extended by another class from outside the package, which will be able to override the original method. A method of a packaged interface can also be "smuggled" out of its package using a class that implements the interface, but inherits an implementation for this method from a superclass that resides outside the package. One more modifier plays a role in restricting the ability to override Java methods—the final modifier strictly forbids overriding a method, or extending a class.

Figure 1B:
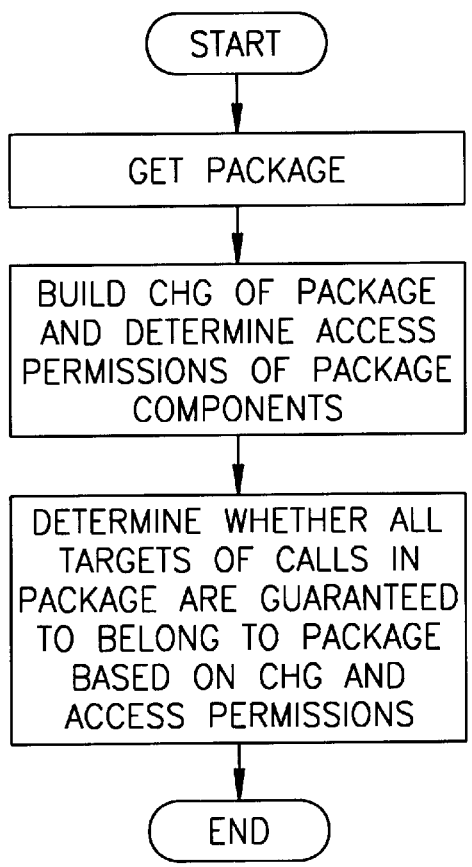

FIGS. 1a and 1b are flow diagrams which summarize the principal operating steps according to the invention. Thus, each package to be analyzed is verified in order to establish that it is both sealed and signed. If so, then as shown in FIG. 1b, the Class Hierarchy Graph (CHG) of the package is built and the respective access permissions of package components are determined These are used together with the fact that the package is known to be sealed and signed to determine whether all targets of calls in the package are guaranteed to belong to the package. Having thus determined that the call is "sealed", this knowledge may be used immediately, for example, to allow compiler optimization. Alternatively, if may be stored separately outside the package for independent use later.

If the package is determined not to be sealed and signed, then a check is made to determine if the results as to whether or not calls are "sealed" and possible targets of sealed calls are to be included in the package. If not, then the package is sealed and signed and the method shown in FIG. 1b is executed as described above. If, on the other hand, the results are to be included in the package, then the method shown in FIG. 1b is executed as described above, and the results as to whether or not calls are "sealed" and possible targets of sealed calls are stored inside the package. The package is then sealed and signed.

It should be noted that the CHG may be derived as an inherent step by the same algorithm which analyzes access permissions or, alternatively, the CHG may be built externally and fed to the algorithm. By the same token, the access permissions too can be derived externally if desired. The algorithm requires these data but it makes no difference whether they are derived externally or as part of the algorithm itself.

Figure 2:
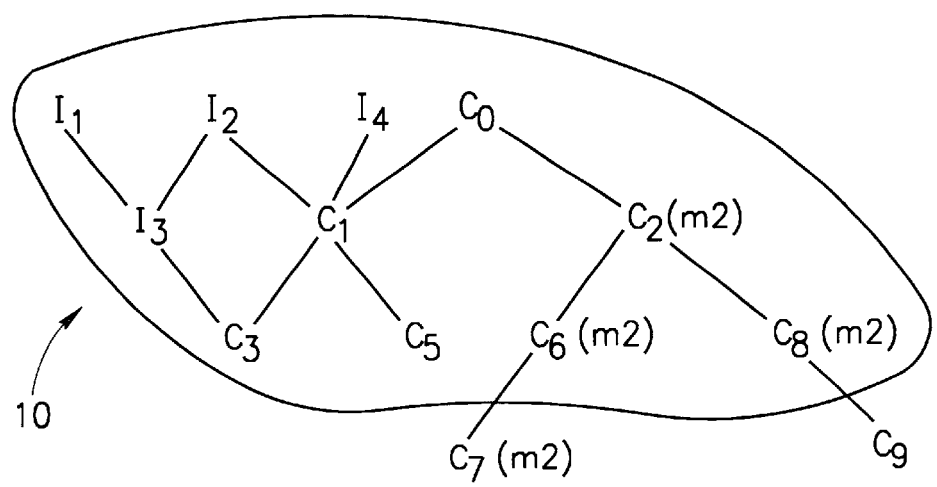
FIGS. 2, 3 and 4 show inheritance scenarios handled by the invention for determining access restrictions imposed on each method in the package.

FIG. 2 shows pictorially an inheritance graph of a sealed package depicted generally as 10 having root interfaces $I_1$, $I_2$ and $I_4$ and a root class $C_o$. A call in the sealed package makes reference to a method $m_2$ which is encapsulated with class $C_2$. It will be seen that the method $m_2$ is overridden by classes $C_6$ and $C_8$ both of which are direct descendants of class $C_2$ within the sealed package 10. Class $C_2$ is assumed to be packaged and to declare method m as packaged. Therefore, no class outside the package 10 can extend class $C_2$ or directly override method $m_2$ of Class $C_2$. Class $C_6$ is assumed to declare method $m_2$ public and non-final whilst class $C_8$ declares method $m_2$ packaged and both classes are assumed to be public and non-final. Therefore, class $C_8$ cannot pass method $m_2$ on to class $C_9$ which is outside the sealed package 10, since it declares $m_2$ packaged. However, descendants of class $C_6$ even outside the sealed package 10, such as class $C_7$, can override the method $m_2$ of class $C_2$, since class $C_6$ is public and declared mg public and non-final. This means that targets of a call to method $m_2$ of class $C_2$ cannot be guaranteed to belong to the sealed package 10, since they could be associated with class $C_7$ outside of the sealed package.

Thus, providing it is established that the package 10 is sealed and signed, then an analysis of the CHG and access permissions of the classes and interfaces in the package provides a determination as to whether all targets to a call can be guaranteed to belong to the sealed package. If so, then the call is "sealed" and the package can be safely optimized; if not, then methods outside of the package may, during runtime, supersede methods encapsulated within the package.

Figure 3:
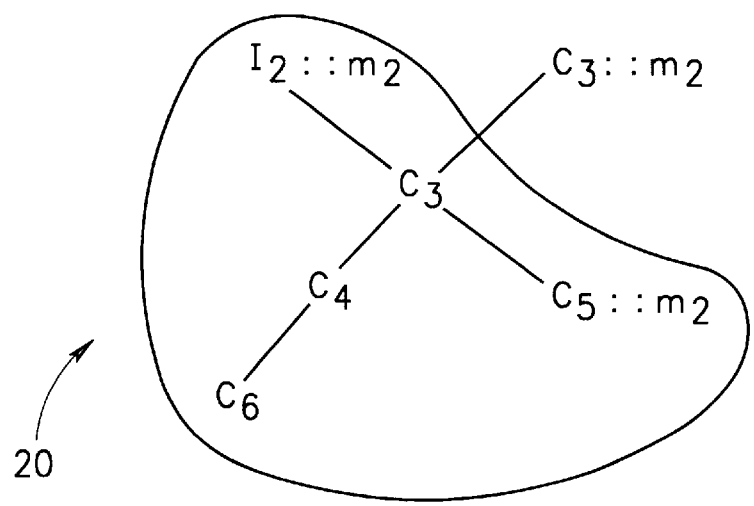

FIG. 3 shows pictorially an inheritance tree of a sealed package depicted generally as 20 having a root interface $I_2$ which declares a method $m_2$. Whilst it is seen that method $m_2$ is implemented in class $C_2$, this class is not a descendant of $I_2$. But $I_2::m_2$ is implemented by class $C_3$ which in turn inherits $m_2$ from class $C_2$ outside the inheritance tree of $I_2$. Thus, a foreign method can be "smuggled" into the package from $C_2$ via $C_3$. By such means, smuggling can occur via a superclass, whereby if $C_2::m_2$ is outside the package, then there is no control over possible targets of a call to method $I_2::m_2$.

Likewise, if the call to $I_2::m_2$ can be resolved at runtime to classes $C_3$, $C_4$, $C_5$ or $C_6$, then it must be determined whether each of the classes $C_3$, $C_4$, $C_5$ or $C_6$ is abstract or has its own method $m_2$ and in such cases the call to $I_2::m_2$ may be declared "sealed". If abstract, then it cannot itself be an actual target at runtime. If it has its own method $m_2$, then clearly its method will be invoked instead of $C_2::m_2$ from outside the package.

Figure 4:
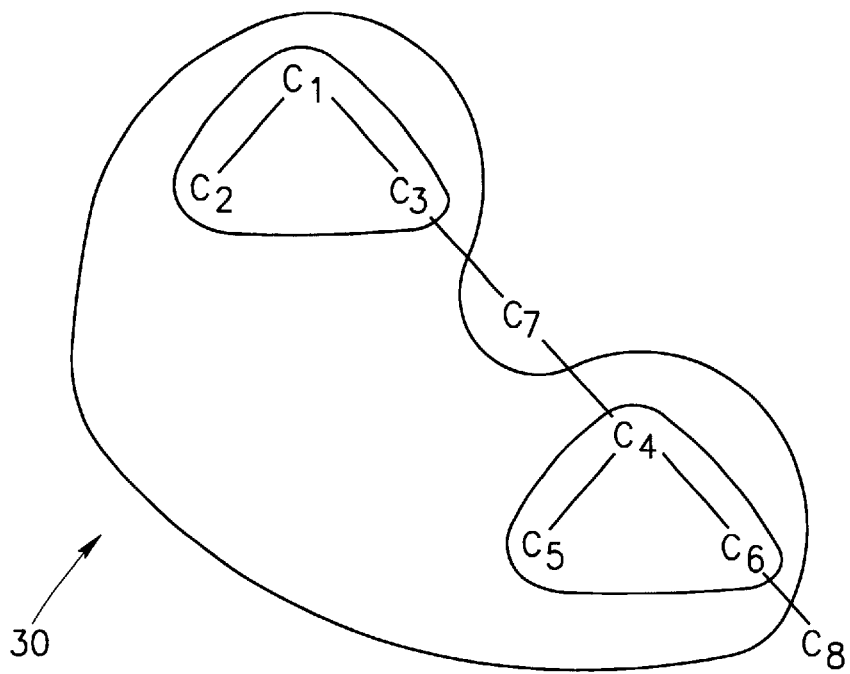

FIG. 4 shows pictorially two inheritance trees of a sealed package depicted generally as 30 having root classes $C_1$ and $C_4$ where class $C_1$ declares method $m_2$ as public and non-final. Class $C_3$ is a public and non-final descendant of $C_1$. In the same package, classes $C_4$ and $C_6$ have no direct inheritance relationship with class $C_3$ within the package 30 but they cannot be ignored since they are able to override the method $m_2$ of $C_3$ via an intermediate class. $C_7$ that does not belong to the same package 30. There thus exists the possibility that a method m declared in a class d may be overridden by another class e within the same sealed package having no apparent inheritance relationship with class d and, in such case, if e::m can be overridden from outside the package then a call to d::m cannot be declared "sealed".

FIGS. 5a to 7 show details of a basic algorithm which takes both class and member access permissions into consideration, and the final modifier, to identify sealed calls. Some of the features of the algorithm are also shown pictorially in FIGS. 2, 3 and 4 described above.

The Basic Algorithm

Suppose we are given a call to method m of class or interface c (denoted by c::m), and we wish to determine whether this call is a sealed call or not. Given the package containing c, we can analyze its classes and interfaces and record the hierarchical inheritance relationships in the form of a Class Hierarchy Graph (CHG) or inheritance graph. Based on the CHU, a standard search for all overridings of method c::m can be enhanced in order to determine if the given call to c: :m is a sealed call.

All the subclasses of c that can potentially override method m (or inherit such an overriding implementation from a superclass) are traversed along this search. These subclasses are all the classes d that extend class c (or implement interface c) directly or indirectly, with the exception that if a class declares method m as final, then all its subclasses are exempted. If such a class d is encountered that is a public non-final class, and that redeclares method m as public and not final, or inherits such a declaration from a superclass, then we can terminate the search—the original call to c::m is not a As sealed call. This is because class d can be extended by some subclass e from another package, and e will be able to override c::m. Otherwise, the call to c::m is a sealed call.

FIGS. 5a to 7 present an implementation for such an algorithm that determines whether a call to c::m is a sealed call or not. FIGS. 6a and 6b deal with the cases where c is a class; FIG. 7 deals with the cases where c is an interface. Following is a description of code related to the PublicNon-FinalSubclassFound constant.

In order to determine direct inheritance between classes and interfaces of the package, it suffices to look inside these classes and interfaces. However, in order to detect indirect inheritance, it may be necessary to examine other classes. For instance, a class of one package can extend a class of another package, which can in turn extend another class of the first package. Thus the former class (indirectly) extends the latter class and both belong to the same package, but no inheritance relations are visible from looking inside the package only. This situation is depicted by package 30 in FIG. 4. The intermediate class, which belongs to a different package (corresponding to class $C_7$ in FIG. 4), must also be examined in order to completely determine the inheritance relationship. Nonetheless we still want to base our algorithm only on the contents of one package: being sealed and signed it is not subject to change, unlike other information.

Such cross-package indirect inheritance can also help "smuggle" a method out of its package. A packaged method of a public class may be overridden by an indirect subclass within the same package (through cross-package inheritance), and the subclass can in turn declare the method public thereby enabling external subclasses to override it.

However, this is the only relevant case: the class must be public in order to be extendable by a class from another package, and the method must be packaged for otherwise it can be smuggled directly. Methods of interfaces cannot be "smuggled" in this way, since they are all public.

The CHG of the package (based only on the contents of the package) does not include arcs that are due to cross-package inheritance. A conservative way to cope with this deficiency, is to assume that any two classes not connected in the inheritance tree of the package, may indirectly extend one another.

The basic algorithms presented in FIGS. 5a, 5b, 6a, 6b and 7 contain a very slight modification to cope with cross-package inheritance. If a public subclass is encountered (along with a packaged non-final declaration of the method) which enables cross-package extension, all other root classes of the package are examined to see if they can potentially override the packaged method. Reference is made to the code related to the PublicNonFinalSubclass-Found constant in FIGS. 5, 6a and 6b.

Regarding the complexity of the algorithm shown in FIGS. 5a, 5b, 6a, 6b and 7, it is first to be noted that the inheritance graph of a package can be constructed efficiently, given the Java class files (bytecodes) or Java source files of the package. Indeed each class can be visited only once to examine its superclass, superinterfaces and declared methods. Given the inheritance graph of the package, the algorithm needs to visit each subclass and occasionally superclasses at most once. However, since a class (interface) can implement (extend) several interfaces, the inheritance graph may not be a tree but a general directed acyclic graph (DAG). Therefore, to avoid visiting classes or interfaces more than once, classes and interfaces can be marked the first time they are visited. Likewise, there can be a marking for (super) classes that have been searched "upwards" for an inherited declaration, and "roots" that have been searched for cross-package inheritance, in order to avoid repeating such searches. These modifications are also relevant to standard algorithms that find all overridings of a method.

In order to accelerate the search for possible cross-package inheritance, the inheritance graph can be preprocessed so that each root-class will contain the list of methods declared (as public) inside its inheritance tree (or vice-versa: each method can be associated with the classes and class-trees it is declared in). Only methods that appear in two different trees are of interest, and trees whose roots directly extend java.lang.Object can be omitted since Object extends no other class.

The algorithm for identifying sealed calls can be adjusted very easily to gather the overriding implementations found along the search, in order to determine the complete set of targets for sealed calls.

On benchmarking the algorithm according to the invention, it was found that a very high percentage of the calls that were found to be sealed, had exactly one possible target, and are therefore good candidates for direct inlining.

Thus, the invention uses the default access permission of packaged classes, interfaces and methods, together with the ability to seal and sign Java packages, to determine the complete set of targets for certain calls.

One way to enhance this analysis and hopefully categorize additional calls as being sealed, is to use liveness information as described by D. Bacon and P. Sweeney, *"Fast Static Analysis of C++ Virtual Function Calls"*, In Proc. of the 1996 ACM Conference on Object Oriented Programming Systems, Languages and Applications (OOPSLA), pp. 325–341, San Jose, Calif., October 1996. For instance, packaged classes or classes with no public (or protected) constructors, can be considered live only if they are instantiated within the package. However, there is little hope of "sealing" additional calls this way, since a public class (causing the call not to be sealed) must be considered live (if it has a public or protected constructor). On the other hand, liveness information can potentially reduce the number of targets a sealed call is known to have.

Another way in which additional calls may be sealed, is to use data-flow analysis to better determine the possible types of the callee-class. Such methods have the potential of identifying additional sealed calls, but they are significantly more complex than the inheritance graph-type algorithm according to the invention.

It will be noted that the algorithm according to the invention categorizes calls as being sealed calls, based on information related only to the called method. Actually, the algorithm identifies sealed methods—methods that can be called only from within the same package, and each such call is guaranteed to be a sealed call.

Software developers may increase the performance of their applications by using the default (packaged) access permission for appropriate classes, interfaces and methods, and by sealing and signing their relevant packages. If the work of an application is concentrated inside packages, and not in calls between packages, it might be accelerated safely.

Figure 8:
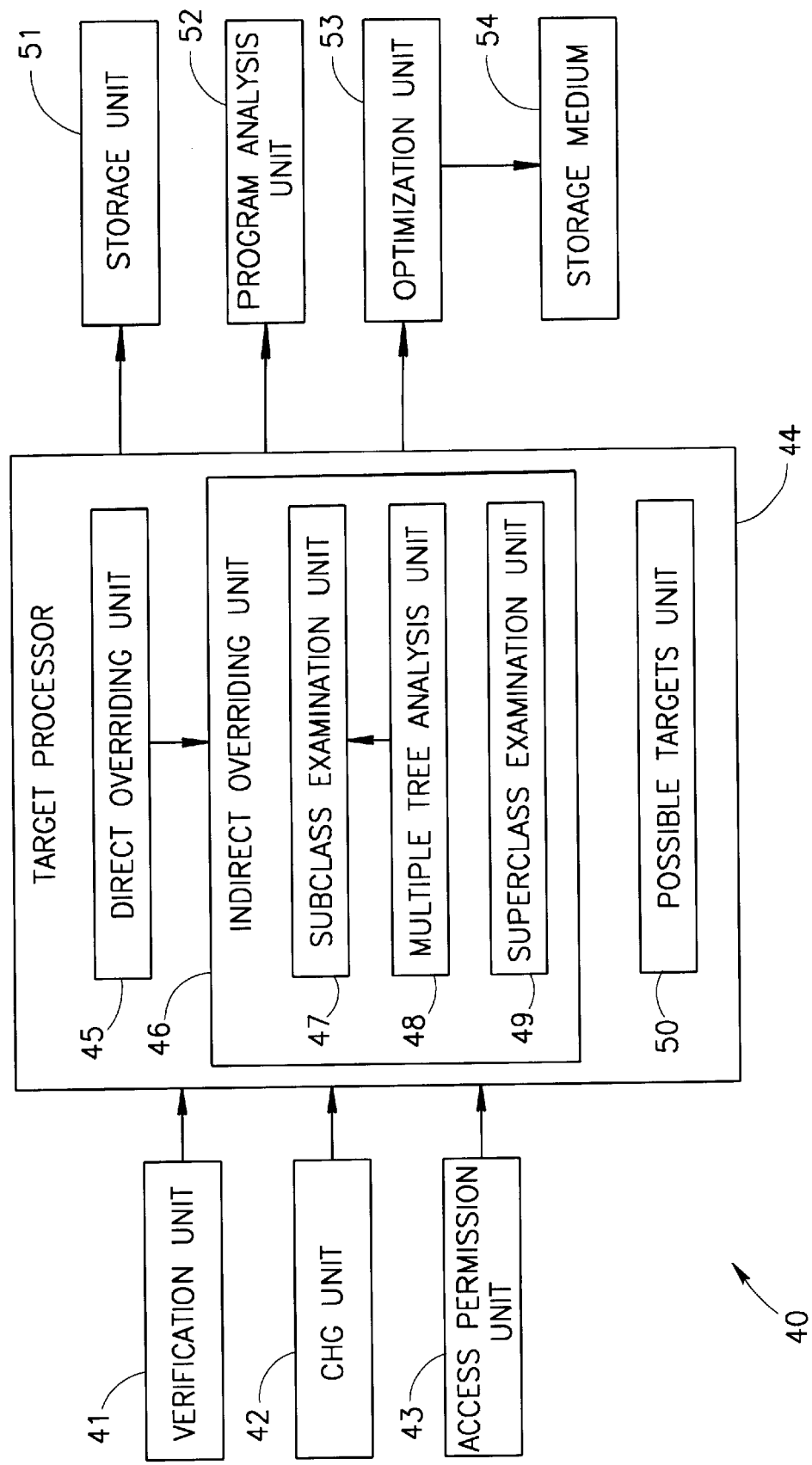
FIG. 8 is a block diagram showing functionally a system for identifying "sealed calls" according to the invention.

FIG. 8 is a block diagram showing functionally a computer system 40 for identifying calls in a Java sealed package whose targets are guaranteed to belong to said is package. The system 40 comprises a verification unit 41 for verifying that the package is sealed and signed and a CHG unit 42 for determining the Class Hierarchy Graph of the package. An access permission unit 43 is provided for determining access permissions of respective components in the package. A target processor 44 is coupled to the verification unit 41, the CHG unit 42 and the access permission unit verification unit 43 and is responsive to the Class Hierarchy Graph and the access permissions in combination with a knowledge that the package is sealed and signed for determining whether all the targets of the calls are guaranteed to belong to said package. The target processor 44 includes a direct overriding unit 45 for determining whether a called method can be directly overridden or implemented by a method from outside the package, and if so identifying the call as one whose targets are not all guaranteed to belong to the same sealed package.

The target processor 44 further includes an indirect overriding unit 46 for determining whether a called method can be overridden or implemented directly or indirectly by a method within the package and thereby be indirectly overridden or implemented by a method from outside the package. If so the system 40 identifies the call as one whose targets are not all guaranteed to belong to the same sealed package.

The indirect overriding unit 46 includes a subclass examination unit 47 for traversing the inheritance graph starting from the class or interface currently being processed along each class or interface and associated subclasses and sub-interfaces in the inheritance graph. The subclass examination unit 47 determines whether there exists a public non-final subclass that declares the method as non-final public or protected or inherits such a declaration from a parent of the class or interface. If so the system 40 identifies the call as one whose targets are not all guaranteed to belong to the same sealed package.

The indirect overriding unit 46 further includes a multiple tree analysis unit 48 for determining whether the class can be subclassed by, and pass the method to, classes of another inheritance tree via one or more classes from outside the package. If so, the subclass examination unit 47 is used in respect of each such inheritance tree.

The indirect overriding unit 46 further includes a superclass examination unit 49 for checking whether the interface can be implemented by a method of an "external" class from outside the package via an "internal" class within the package that implements the interface and inherits the implementation of the method from the external class, such that the internal class can be instantiated. If so the system 40 identifies the call as one whose targets are not all guaranteed to belong to the same sealed package.

The target processor further includes a possible targets unit 50 for determining a set of possible targets for a call whose targets are all guaranteed to belong to the same sealed package.

A storage unit 51 is coupled to the output of the target processor 44 for storing the results as to whether or not calls in the package are identified as calls whose targets are all guaranteed to belong to the same sealed package. As noted above with reference to FIG. 1a, this information may be stored separately inside or outside the package for independent use later.

A program analysis unit 52 is also coupled to the output of the target processor 44 for performing inter-procedural program analysis of a Java package using is information about calls whose targets are guaranteed to belong to the same package. Also connected to the output of the target processor 44 is an optimization unit 53 which performs inter-procedural code and/or compiler optimization of a Java package using information about calls whose targets are guaranteed to belong to the same package. Coupled to the optimization unit 53 is a storage medium 54 on which there may be stored an optimized compiled program derived from the optimization unit 53.

It will be appreciated that the invention also contemplates a storage medium which stores a computer program for carrying out according to the invention, as well as a storage medium which stores compiled program data generated according to the invention.

In the method claims which follow, alphabetic characters used to designate claim steps are provided for convenience only and do not imply any particular order of performing the steps. Likewise, it will be appreciated that the order in which calls are eliminated as being "sealed" is unimportant and therefore the order in which method claims appear should not be taken as binding.

What is claimed is:

1. A method for identifying calls in a Java sealed package whose targets are guaranteed to belong to said sealed package, comprising the steps of:

(a) verifying that a Java package is sealed and signed;

(b) obtaining a class hierarchy graph for classes and interfaces of said package;

(c) obtaining access permissions of respective components in said package; and (d) using the class hierarchy graph and access permissions in combination with a knowledge that said package is sealed and signed to determine whether all the targets of the calls are guaranteed to belong to said package.

2. The method according to claim 1, wherein step (d) includes:

i) determining whether a called method can be directly overridden or implemented by a method from outside said package; and ii) if so, identifying the call as one whose targets are not all guaranteed to belong to a common Java package.

3. The method according to claim 2, further including the steps of:

iii) determining whether a called method can be overridden or implemented directly or indirectly within said package and thereby be indirectly overridden or implemented by a method outside said package; and iv) if so, identifying the call as one whose targets are not all guaranteed to belong to a common Java package.

4. The method according to claim 3, wherein step (i) comprises the steps of:

(a) traversing the class hierarchy graph starting from the class or interface of said called method;

(b) searching for a public non-final subclass that declares the called method as non-final public or protected or inherits such a declaration from a parent of said class or interface; and (c) if such a subclass is found then identifying the call as one whose targets are not all guaranteed to belong to a common Java package.

5. The method according to claim 4, further including the steps of:

(a) determining whether said class can be subclassed by, and pass said called method to, classes of another inheritance tree via one or more classes from outside said package; and, if so, then (b) applying the called method according to claim 4 to the classes of said other inheritance tree as well when considering methods of said class.

6. The method according to claim 5, including:

(d) checking whether a method of an interface can be implemented by an external class method of an "external" class from outside said package via an "internal" class within said package that implements the interface and inherits the implementation of the external class method from the external class;

(e) checking whether such an internal class can be instantiated; and (f) if such a class or subclass is found then identifying the call as one whose targets are not all guaranteed to belong to said package.

7. The method according to claim 6, further including:

(g) if the call has not been identified as one whose targets are not all guaranteed to belong to a common Java package, then identifying the call as one whose targets are all guaranteed to belong to said Java sealed package.

8. The method according to claim 7, further including:

(h) determining a set of possible targets for calls whose targets are all guaranteed to belong to said Java sealed package.

9. The method according to claim 8, further including:

(i) performing inter-procedural program analysis and/or optimization of a Java sealed package using information on calls whose targets are all guaranteed to belong to said sealed package.

10. The method according to claim 7, including the step of embedding inside the Java sealed package an indication of calls whose targets are all guaranteed to belong to said Java sealed package as well as said targets.

11. The method according to claim 1, being performed at substantially the same time as said package is sealed and signed.

12. The method according to claim 1, being performed after the Java sealed package has been sealed and signed.

13. The method according to claim 12, being performed prior to program analysis and/or optimization.

14. The method according to claim 12, being performed substantially together with program analysis and/or optimization.

15. A computer system for identifying calls in a Java sealed package whose targets are guaranteed to belong to said sealed package, said computer system comprising:
- a verification unit for verifying whether a Java package is already sealed and signed or is to be sealed and signed; and
- a target processor coupled to the verification unit, being responsive to a previously derived inheritance graph and previously derived access permissions in combination with a knowledge that said package is sealed and signed for determining whether all the targets of calls are guaranteed to belong to said sealed package.

16. The system according to claim 15, further including:
- a Class Hierarchy Graph (CHG) unit for building an inheritance graph of classes and interfaces of said package; and
- an access permission unit for determining access permissions and related modifiers of respective components in said package;
- the target processor being coupled to the CHG unit and the access permission unit for receiving therefrom the previously derived inheritance graph and previously derived access permissions.

17. The system according to claim 15, wherein the target processor includes:
- a direct overriding unit for determining whether a called method can be directly overridden or implemented by a method from outside said package, and if so identifying the call as one whose targets are not all guaranteed to belong to said package.

18. The system according to claim 15, wherein the target processor includes:
- an indirect overriding unit for determining whether a called method belonging to a class and an interface can be overridden or implemented directly or indirectly by a method within said package and thereby be indirectly overridden or implemented by a method outside said package, and if so identifying the call as one whose targets are not all guaranteed to belong to said package.

19. The system according to claim 18, wherein the indirect overriding unit includes:
- a subclass examination unit for traversing the previously derived inheritance graph starting from the class or interface of the called method and determining whether there exists a public non-final subclass that declares the called method as non-final public or protected or inherits such a declaration from a parent of said class or interface, and if so identifying the call as one whose targets are not all guaranteed to belong to said package.

20. The system according to claim 18, wherein the indirect overriding unit includes:
- a multiple tree analysis unit for determining whether the class of the called method can be subclassed by, and pass the called method to, classes of another inheritance tree via one or more classes from outside the sealed package, and if so, using the subclass examination unit in respect of each such inheritance tree.

21. The system according to claim 18, wherein the indirect overriding unit includes:
- a superclass examination unit for checking whether the interface of the called method can be implemented by a method of an "external" class from outside said package via an "internal" class within said package that implements the interface and inherits the implementation of the called method from the external class, such that the internal class can be instantiated, and if so identifying the call as one whose targets are not all guaranteed to belong to said package.

22. The system according to claim 18, wherein the target processor further includes:
- a possible targets unit for determining a set of possible targets for calls whose targets are all guaranteed to belong to said package.

23. The system according to claim 15, further including a program analysis unit coupled to the target processor for performing inter-procedural program analysis of a Java package using information about calls whose targets are all guaranteed to belong to said package.

24. The system according to claim 15, further including an optimization unit coupled to the target processor for performing inter-procedural optimization of a Java package using information about calls whose targets are all guaranteed to belong to said package.

25. The system according to claim 24, further including a storage medium coupled to the optimization unit for storing optimized program data generated by the optimization unit.

26. The system according to claim 15, further including a storage unit coupled to the target processor for storing, inside or outside the package, information about calls whose targets are all guaranteed to belong to said package.

27. A program storage device readable by machine, tangibly embodying a program of instructions executable by the machine to perform method steps for identifying calls in a Java sealed package whose targets are guaranteed to belong to said package, comprising the steps of:
- (a) verifying that a Java package is sealed and signed,
- (b) obtaining a class hierarchy graph for classes and interfaces of said package,
- (c) obtaining access permissions of respective components in said package, and
- (d) using the class hierarchy graph and access permissions in combination with a knowledge that said package is sealed and signed to determine whether all the targets of the calls are guaranteed to belong to said package.

28. The program storage device according to claim 27, further including:
- (e) performing inter-procedural program analysis and/or optimization of a Java sealed package using information on calls whose targets are all guaranteed to belong to said package.

29. A computer program product comprising a computer useable medium having computer readable program code embodied therein for identifying calls in a Java sealed package whose targets are guaranteed to belong to said package, the computer program product comprising:
- computer readable program code for causing the computer to verify that a Java package is sealed and signed;
- computer readable program code for causing the computer to obtain a class hierarchy graph for classes and interfaces of said package;

computer readable program code for causing the computer to obtain access permissions of respective components in said package; and computer readable program code for causing the computer to use the class hierarchy graph and access permissions in combination with a knowledge that said package is sealed and signed to determine whether all the targets of the calls are guaranteed to belong to said package.

30. The computer program product according to claim 29, further comprising:

computer readable program code for causing the computer to perform inter-procedural program analysis and/or optimization of a Java sealed package using information on calls whose targets are all guaranteed to belong to said package.

* * * * *